United States Patent [19]

Laesser et al.

[11] 4,139,279
[45] Feb. 13, 1979

[54] ELECTRONIC INSTRUMENT

[75] Inventors: Claude Laesser, La Chaux-de-Fonds; René Viennet, Neuchatel; Hubert Portmann, Colombier, all of Switzerland

[73] Assignee: Ebauches S.A., Neuchatel, Switzerland

[21] Appl. No.: 796,526

[22] Filed: May 13, 1977

[30] Foreign Application Priority Data

May 20, 1976 [CH] Switzerland .................. 6336/76

[51] Int. Cl.$^2$ ............................................. G02F 1/13
[52] U.S. Cl. ................................... 350/334; 350/338; 350/347; 350/352; 58/23 C
[58] Field of Search ............... 58/50 R, 23 BA, 23 R, 58/23 C; 350/334, 338, 347, 352

[56] References Cited

U.S. PATENT DOCUMENTS

| 3,630,015 | 12/1971 | Lehovec | 58/50 R |
|---|---|---|---|
| 3,823,551 | 7/1974 | Riehl | 58/23 BA |
| 4,017,156 | 4/1977 | Moriyama et al. | 350/157 X |
| 4,032,218 | 6/1977 | Scheffer | 350/150 X |

*Primary Examiner*—Edward S. Bauer
*Attorney, Agent, or Firm*—Silverman, Cass & Singer, Ltd.

[57] ABSTRACT

An electronic timepiece provides photo-electric cells disposed behind a passive electro-optic display cell for recharging a storage battery. The timepiece includes in its display a polarizer, a passive electro-optic device such as a liquid crystal, a quarter-wave plate, a cholesteric liquid crystal reflector and photo-electric cell arranged in superposition upon each other. Ambient light passing through the cholesteric reflector is used to energize the photo-electric cells which recharge the storage battery. Ambient light reflected by the cholesteric reflector is used to indicate the displayed information.

1 Claim, 1 Drawing Figure

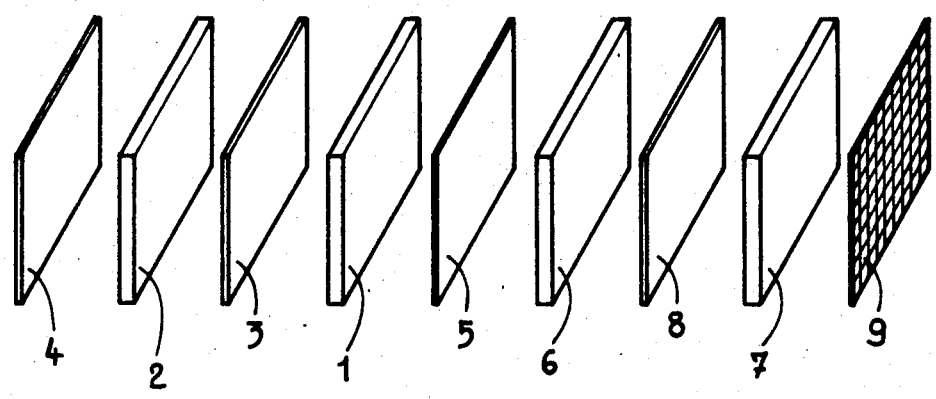

ELECTRONIC INSTRUMENT

BACKGROUND OF THE INVENTION

The present invention relates to an electronic instrument, especially a timepiece, with at least one storage battery, comprising photo-electric cells ensuring the recharging of the storage battery, and an electro-optic passive display cell, provided with a polarizer and a diffuser constituted by a cholesteric liquid crystal cell.

Electronic watches comprising photo-electric cells for recharging of their storage battery and in which the display is afforded by a liquid crystal cell are known. In the watches of this type, however, the display cell and the photo-electric cells for recharging the storage battery or batteries are juxtaposed, which presents some drawbacks: As a matter of fact, these watches are not only not aesthetic, due to the unpleasant appearance of the photo-electric cells, but they cannot comprise a display cell of more than 3 to 5 digits, due to the large surface area required for the photo-electric cells. But the display and photo-electric cells, all have to be situated on the front face of the watch since they have either to be easy to be observed or to be able to be reached by the surrounding light.

The purpose of the present invention is to furnish a watch of the above mentioned type, the diffusing effect of the liquid crystal cell which will be ensured by a cholesteric liquid crystal cell, and in which one does not find these drawbacks.

SUMMARY OF THE INVENTION

To this effect, the electronic instrument according to the invention is characterized by the fact that its photo-electric cells are situated behind the cholesteric liquid crystal cell, so that the light which is not reflected by the diffuser activates the photo-electric cells.

DESCRIPTION OF THE DRAWINGS

The drawing shows, by way of example, one embodiment of the object of the invention.

The sole FIGURE is a diagrammatic perspective view, exploded, of a display cell and of photo-electric cells intended to be used in a wrist-watch.

DESCRIPTION OF THE INVENTION

The display cell represented comprises two glass plates 1 and 2 between which is interposed a coating of nematic liquid crystal 3. In front of the cell is arranged a polarizer 4 and, at the rear, a quarter-wave plate 5 which replaces the second polarizer conventionally used in electro-optic display cells having liquid crystals.

A second cell, constituted of two glass plates 6 and 7 between which is interposed a coating 8 of cholesteric liquid crystal is placed behind the quarter-wave plate 5.

At last, a whole array of photo-electric cells 9 is placed behind the glass plate 7 of the second cell.

The device as disclosed and represented operates as follows:

The light entering into the first cell is polarized vertically by the polarizer 4, this cell being suitably oriented. In the areas where no electric field is applied to the liquid crystal 3, its molecules are oriented helically so that the plane of polarization of the light rotates 90°. Hence, in this case, the light going out of the liquid crystal 3 is polarized horizontally. After it passes through the quarter-wave plate 5, it is polarized circularly, the vector of rotation rotating to the left, with the quarter-wave plate being suitably oriented. The cholesteric liquid crystal 8 has a property of reflecting circularly polarized light having the same sense of rotation as the cholesteric liquid crystal for a band of wave lengths defined by its own characterictics. Hence, the circularly polarized light having a rotation to the left is partially reflected by the cholesteric liquid crystal 8. The reflected portion of light passes again through the quarter-wave plate 5, but in the reverse sense, polarized linearly in a horizontal plane. The light then passes through the coating 3 of the nematic liquid crystal where the plane of polarisation rotates 90°. The vertically polarized light then passes through the polarizer 4. The areas where no field is applied to the liquid crystal 3 will appear then to the user as being light, of the color corresponding to the band of wave lengths reflected by the cholesteric liquid crystal. The portion of the light whose wave length is outside the band of reflection passes through the cholesteric liquid crystal and activates the photo-electric cells 9.

In the areas where an electric field is applied to the terminals of the nematic liquid crystal 3, its molecules do not maintain their helical structure but move in the sense of the field and orient themselves perpendicularly to the plane of the cell. Consequently, the polarization of the light is not affected and the light leaves the coating 3 of the liquid crystal polarized vertically the same as it entered therein. The quarter-wave plate 5 polarizes the light circularly, but, this time, the plane of polarization rotates to the right, so that almost all the light passes through the cholesteric liquid crystal and reaches the photo-electric cells 9. Hence in the areas where an electric field is applied, the display cell appears dark.

Thus, the part of the display cell where there is no electric field applied to the nematic liquid crystal appears light to the observer and activates only weakly the photo-electric cells, while, where an electric field is applied to the nematic crystal, almost all of the light reaches the photo-electric cells which serves to recharge the storage battery. The efficiency of the photo-electric cells is consequently relatively poor when one displays dark characters on a light background.

On the other hand, the efficiency is better with the reverse arrangement where the display is effected in light characters on a dark background. Then, across the whole surface of the background, with the exception of the activated areas, the light reaches the photo-electric cells and is used for recharging the storage battery or batteries. One realises such a cell by rotating, for instance, the polarizers or the quarter-wave plate 90°, or by choosing a cholesteric liquid crystal the rotation of polarization of which occurs in the reverse sense.

One must however note that the density of light activating the photo-electric cells remains substantially lower than the density which is obtained with cells arranged at the side of the display cell. This drawback is widely compensated for by the fact that one uses a greater surface for the photo-electric cells.

It is to be noted that the invention could be applied not only to an electronic timepiece, but to other electronic instruments, for instance computers.

What we claim is:

1. An electronic instrument having a battery comprising, a polarizer for vertically polarizing light, an electro-optic display cell adjacent the polarizer for rotating the plane of polarization of light transmitted therethrough in the absence of an applied electric field and for transmitting light with its plane of polarization unchanged when an electric field is applied, a quarter-wave plate adjacent the side of said electro-optic cell opposite said polarizer for converting light from the cell to circularly polarized light of one handedness when an electric field is applied to said cell and for converting light from the cell to circularly polarized light of the opposite handedness when no electric field is applied to said cell, a cholesteric liquid crystal cell on the side of said quarter-wave plate opposite said electro-optic cell for reflecting circularly polarized light of one handedness within a given wave length band and for transmitting the remainder of the light, and photo-electric cells on the side of said cholesteric liquid crystal cell opposite said electro-optic cell and said quarter-wave plate such that light which is not reflected by said cholesteric liquid crystal cell activates the photo electric cells for recharging the battery.

* * * * *